(12) United States Patent
Sanders

(10) Patent No.: US 11,818,202 B2
(45) Date of Patent: Nov. 14, 2023

(54) SYSTEM AND METHOD FOR HIGH AVAILABILITY TAX COMPUTING

(71) Applicant: Steven Michael Sanders, Cumming, GA (US)

(72) Inventor: Steven Michael Sanders, Cumming, GA (US)

(73) Assignee: CERETAX, INC., Alpharetta, GA (US)

( * ) Notice: Subject to any disclaimer, the term of this patent is extended or adjusted under 35 U.S.C. 154(b) by 0 days.

(21) Appl. No.: 17/691,790

(22) Filed: Mar. 10, 2022

(65) Prior Publication Data

US 2022/0294845 A1 Sep. 15, 2022

Related U.S. Application Data

(60) Provisional application No. 63/160,614, filed on Mar. 12, 2021.

(51) Int. Cl.
*H04L 67/1012* (2022.01)
*G06Q 40/12* (2023.01)
*H04L 67/1095* (2022.01)

(52) U.S. Cl.
CPC ....... *H04L 67/1012* (2013.01); *G06Q 40/123* (2013.12); *H04L 67/1095* (2013.01)

(58) Field of Classification Search
CPC ............. H04L 67/1012; H04L 67/1095; H04L 41/0663; H04L 67/1034; H04L 69/40; G06Q 40/123; G06F 11/00
See application file for complete search history.

(56) References Cited

U.S. PATENT DOCUMENTS

| | | | | |
|---|---|---|---|---|
| 9,411,969 B2 * | 8/2016 | Hecht | ................... | G06F 21/604 |
| 10,193,877 B2 * | 1/2019 | Chizhov | ............. | G06F 21/6236 |
| 11,531,967 B2 * | 12/2022 | Aboel-Nil | ............ | G06Q 10/107 |
| 2016/0048408 A1 * | 2/2016 | Madhu | .................. | H04L 47/783 718/1 |
| 2021/0400046 A1 * | 12/2021 | Castinado | ............... | G06F 16/29 |

* cited by examiner

*Primary Examiner* — Sm A Rahman

(57) ABSTRACT

A high availability tax computing system. The system includes an enterprise computing system, a network system and an enterprise management system. The enterprise computing system performs tax computations consistent with tax calculation rules and pushes the tax computations results to the enterprise management system during a synchronization process. The synchronization process is performed consistent with synchronization rules. The tax computation rules and the synchronization rules may be customized. The enterprise management system performs configuration and maintenance operations to the enterprise computing device in the enterprise computing system.

17 Claims, 4 Drawing Sheets

US 11,818,202 B2

SYSTEM AND METHOD FOR HIGH AVAILABILITY TAX COMPUTING

CROSS-REFERENCE TO RELATED APPLICATIONS

This application claims the benefit of priority of U.S. Provisional Application No. 63/160,614 filed on Mar. 12, 2021, the disclosure of which is incorporated herein by reference in its entirety.

FIELD OF THE INVENTION

Embodiments described herein generally relate to a high availability computing system, and more particularly to a high availability tax computing system.

BACKGROUND OF THE INVENTION

Historically, tax computations (e.g., indirect tax) were delivered via complex, on-premise applications that required hours of technical and consulting resources to install and imbed the tax system into a client's ecosystem. Financial packages, accounting systems, enterprise resource planning systems (ERP), and billing solutions all had to be integrated into a tax computation engine that would accept the sales or purchase transaction data, render the tax decisions, and then generate the results to be populated into the various systems with the appropriate AR, AP, and billing data. This method is very expensive to implement and maintain as it requires resources to manage monthly updates for taxing locations, districts, rates, applicability and other information changes.

Moreover, cloud based applications may provide quicker implementations; however, the cloud based applications also present significant challenges, such as, for example, service disruption which causes the service to go down, data to be lost, and slow performance. For clients that require the indirect tax calculation process within their production financial workflow, this situation can be detrimental as transactions cannot complete and finalize. Hence there is a need in the art for a high availability tax computing system.

BRIEF DESCRIPTION OF THE DRAWINGS

The various advantages of the embodiments of the present disclosure will become apparent to one skilled in the art by reading the following specification and appended claims, and by referencing the following drawings, in which:

SUMMARY OF THE INVENTION

Exemplary embodiments disclosed herein describe a system and method for providing high availability tax computing. The system includes an enterprise computing system, a network system and an enterprise management system. The enterprise computing system performs tax computations consistent with tax calculation rules and pushes the tax computations results to the enterprise management system during a synchronization process. The synchronization process is performed consistent with synchronization rules. The tax computation rules and the synchronization rules may be customized. The enterprise management system performs configuration and maintenance operations to the enterprise computing device in the enterprise computing system.

DETAILED DESCRIPTION

Figure 1:
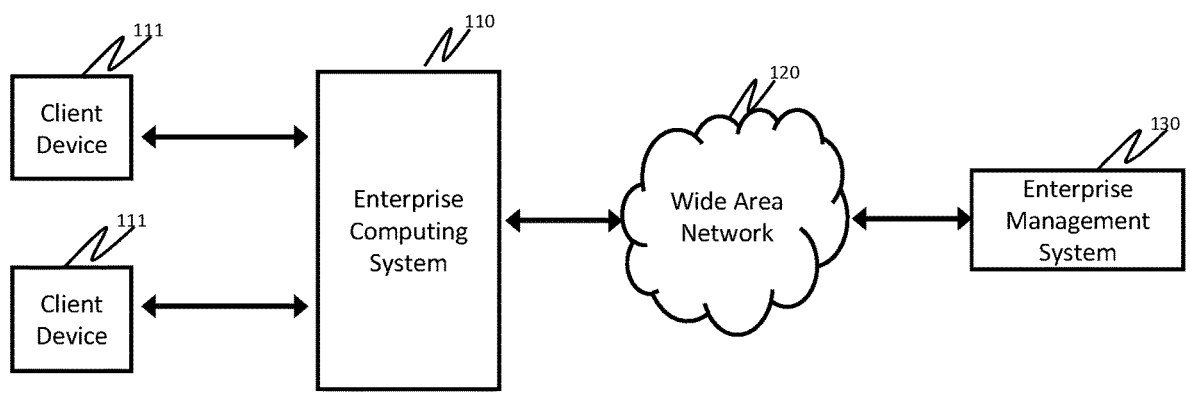
FIG. 1 shows a high-level block diagram of an exemplary high availability tax computing system configured to operate according to an embodiment of the present disclosure.

FIG. 1 shows an exemplary high availability tax computing system ("the system") 100. The system 100 is a hybrid computing system including an on-premise enterprise system (e.g., enterprise computing system 110), a network system 120 (e.g., WAN) and a cloud based management system (e.g., enterprise management system 130). The enterprise computing system 110 interfaces with client device(s) 111. Although not shown, the system 100 includes one or more electronic communications channels for transmitting data between enterprise computing system 110, network system 120, and enterprise management system 130. While a limited number of systems (i.e., enterprise computing system, network system and enterprise management system) have been shown, any number of these systems may be used.

Client device(s) 111 can be any computer processing device, such as, for example, a mobile phone, laptop, desktop, any kind of handheld computer processing system, a personal computer, minicomputer, microprocessor, workstation, mainframe, or similar computing platform. Each client device includes memory, communication modules, display, user interface and applications (all not shown). The communication modules include a network module, such as, for example, a wireless network card, for communication with enterprise network 114. The communication modules can be processors embedded with computer readable instructions that when executed perform various communication functions. Each client device 111 may be connected to enterprise network 114 and may be an end user for receiving the data processed by the enterprise computation system 110 (e.g., tax calculations results). Each client device may send data to the enterprise computation system. In another embodiment, each client device may send data to the enterprise management system 130.

Network system 120 may include a plurality of computers or servers (not shown) located in many different geographic locations. The network system may comprise, for example, a wide area network (WAN), a local area network (LAN) or the Internet. The network system provides communication among the devices in the computer system using one or more communications protocols.

The enterprise management system ("EMS") 130 may include one or more programs, one or more processors and one or more computer readable storage media. The EMS is configured to perform configuration and updates/maintenance operations to each enterprise computing device(s) 112a-112c in the enterprise computing system 110. Moreover, the EMS is configured to receive processed data from the enterprise computing system 110 for persistent storage.

The EMS 130 may receive configuration data from one or more resources (e.g., an enterprise server, an enterprise host, a client device 111, etc.). The configuration data may include user customizable rules for processing data (e.g., data processing performed by an enterprise computing device (e.g., 112a) or by a cluster of enterprise computing devices 112a-112c), and user customizable rules for synchronizing data (e.g., the synchronization of data that occurs between an enterprise computing device/a cluster of enterprise computing devices and the enterprise management system 130) and updates thereto (i.e., changes made to the user customizable data processing rules and/or the user customizable synchronization rules). Moreover, the configuration data may include maintenance data (and updates thereto) for performing maintenance on an enterprise computing device (e.g., 112a) or a cluster of enterprise computing devices 112a-112c, and/or system data/installation data (and updates thereto) for performing system processing operations or installation operations on an enterprise computing device (e.g., 112a) or a cluster of enterprise computing devices 112a-112c.

The EMS 130 is configured to send the configuration data to the enterprise computing device/cluster of enterprise computing devices, and the enterprise computing device/cluster of enterprise computing devices are configured to automatically process the configuration data upon receipt. The configuration data is intercepted by a firewall before transmission to the enterprise computing device/cluster of enterprise computing devices and is only transmitted to the enterprise computing device/cluster of enterprise computing devices after approval of the configuration data by the firewall.

In a preferred embodiment, the EMS 130 is configured in a cloud computing environment (i.e., cloud-based). The cloud computing environment can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

The cloud computing environment includes a cloud network which may include back-end platforms, e.g., servers, storage, server farms or data centers. The users or the cloud network can correspond to a single organization/tenant (e.g., enterprise computing system 110) or multiple organizations/tenants. More particularly, in one illustrative implementation, the cloud computing environment may provide a private cloud serving a single organization (e.g., enterprise computing system 110). In another example, the cloud computing environment may provide a community or public cloud serving multiple organizations/tenants.

Moreover, the cloud computing environment 300 may provide cloud-based delivery of different types of cloud computing services, such as Software as a service (SaaS), Platform as a Service (PaaS), Infrastructure as a Service (IaaS), and Desktop as a Service (DaaS).

Figure 2:
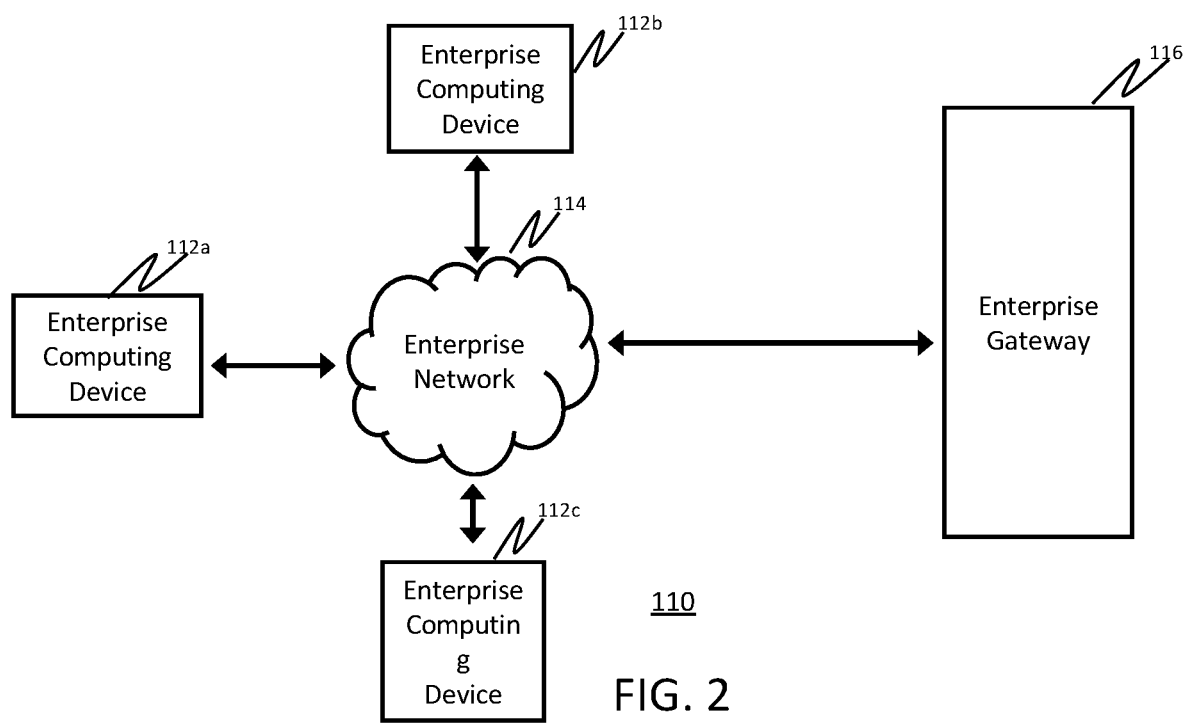
FIG. 2 is a block diagram illustrating an exemplary enterprise computing system according to an exemplary embodiment of the present disclosure.

As illustrated in FIG. 2, the enterprise computing system ("ECS") 110 may include at least one enterprise computing engine 112, an enterprise network 114 and an enterprise gateway 116. The at least one enterprise computing engine is configured to run (i.e., execute/process) at least one on-premise application. In an aspect, the at least one enterprise computing engine may include at least one enterprise computing device (e.g., 112a). In another aspect, the at least one enterprise computing engine may include at least one cluster of enterprise computing devices (e.g., 112a-112c). While a limited number of enterprise computing devices and clusters have been illustrated, any plural number of enterprise computing devices may be included in a cluster, and any number of clusters may be included in an enterprise computing system 110.

The enterprise network 114 may include a corporate wired LAN, a wireless LAN, and one or more private data centers. Moreover, the enterprise network may include a WAN to connect remote offices, as well as connectivity to the public internet and public cloud resources. The enterprise network 114 may provide an intranet to the cluster of tax computers 112a-112c and client devices 115. The enterprise network may include a plurality of computers or servers (not shown) located in many different geographic locations. The enterprise network may provide communication among the devices in the enterprise computing system 110 using one or more communications protocols.

In a preferred embodiment, the enterprise network 114 includes an internal network that is private (i.e., access is restricted), proprietary and accessible only by authenticated users who are given access to the internal network, such as, for example, employees and individual contractors (i.e., temporary employees) of a specific entity (e.g., a corporation or similar business entity). All devices (e.g., enterprise computing devices 112a-112c) connected to the internal network are protected by a firewall and are identified as an on-premise device. All applications running on the internal network are considered on-premise applications. The internal network does not include portions of the Internet or any other network community open to the public, such as membership or subscription driven groups, associations and similar organizations.

The enterprise gateway 116 connects enterprise network 114 to network system 120 and regulates network traffic between them. The enterprise gateway can translate the protocols used on the enterprise network 114 with those used on network system 120. The enterprise gateway may include a firewall for monitoring incoming and outgoing network traffic and deciding whether to allow or block specific traffic based on a set of security rules. It can also establish a barrier between enterprise network 114 and incoming traffic from network system 120) in order to block malicious traffic like viruses and hackers. The enterprise gateway may include a plurality of computers and routers located in many different geographic locations. The enterprise gateway may provide communication among the devices in the enterprise computing system 110 using one or more communications protocols.

Figure 3:
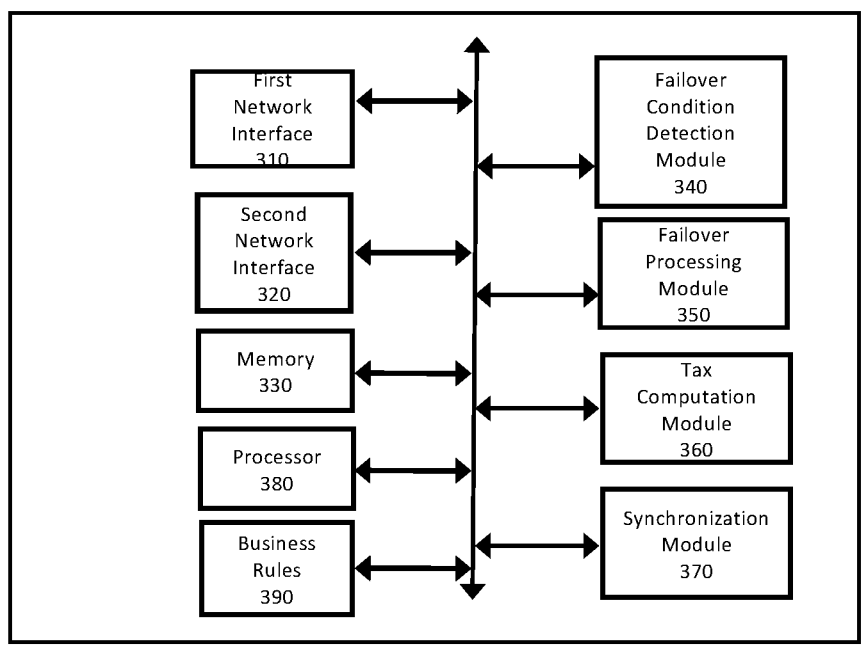
FIG. 3 is a block diagram illustrating an exemplary enterprise computing device according to an exemplary embodiment of the present disclosure.

FIG. 3 is a block diagram illustrating an exemplary enterprise computing device (e.g., 112a). Each enterprise computing device may include a first network interface 310, a second network interface 320, a memory 330 (e.g., random access memory (RAM), non-volatile secondary storage (e.g., a hard drive, a floppy drive, and a CD-ROM drive)), a failover condition detection module 340, a failover processing module 350, a tax computation module 360, a synchronization module 370, a processor 380 (e.g., a central processing unit (CPU) or microprocessor), business rules 390 and any other combination of hardware and software components as desired.

The first network interface 310 (i.e., interface to enterprise network 114) may be configured to receive data from client device(s) 111. Moreover, the first network interface may be configured to send data to client device(s) 111 (e.g., tax calculation results). As such, the first network interface may include any interface configuration (e.g., a wired or wireless Ethernet card and a digital and/or analog input/output card) necessary to receive/send data from/to client device 111.

The second network interface 320 (i.e., interface to network system 120) can be configured to send and receive data to/from enterprise management system 130. Each enterprise computing device (e.g., 112a) may send data, such as, for example, tax calculation results to enterprise management system 130. Each enterprise computing device may receive data from enterprise management system 130, such as, for example, maintenance data, module updates, tax computation rules, tax input data for performing the tax calculations, etc. As such, the second network interface 320 may include any interface configuration (e.g., a wired or wireless Ethernet card and a digital and/or analog input/output card) necessary to receive/send data from/to enterprise management system 130.

Program code (i.e., program instructions), such as the code comprised in failover condition detection module 340, failover processing module 350, tax computation module 360, synchronization module 370, and program data, such as business rules 390 (e.g., tax computation rules, and synchronization rules), can be loaded into the RAM from a non-volatile secondary storage and provided to the processor 380 for execution. The processor 380 can generate and store results in memory 330 for subsequent access, display, output and/or transmission to other computer systems and computer programs.

Modules 340, 350, 360 and 370 may comprise multiple hardware or software modules which contain program instructions that cause processor 380 to detect a failover condition within the cluster (performed by failover condition detection module 340), initiate failover processing when a failover condition is detected (performed by failover processing module 350), receive data from enterprise management system and performing computations on the received data (performed by tax computation module 360), synchronizing data with enterprise management system consistent with user specified rules (performed by synchronization module 370), and performing a variety of specific tasks required to access memory 330 to index, read, parse, tag, or store data therein. These modules are flexible, and may be configured to use a large variety of different business rules, including without limitation, tax computation, failover and synchronization.

In another aspect, each enterprise computing device 112a-112c may be configured as an edge computing device. Each edge computing device may be located at an access point of the enterprise network 114, very close to the end users (e.g., one hop away), for processing data (e.g., performing tax computations) at the edge of the network, which provides shorter response times to end users and more efficient processing than processing the data at the cloud enterprise management system 130. Moreover, each edge computing device may be configured as a tax computing device (i.e., each device processes tax computations).

Edge computing will bring computation and data storage closer to the devices where it's being gathered (e.g., client devices 111), rather than relying on a central location that can be thousands of miles away. This is done so that data, especially real-time data, does not suffer latency issues that can affect an application's performance. In addition, an organization can save money by having the processing done locally, thereby reducing the amount of data that needs to be processed in a centralized or cloud-based location.

Each edge computing device may serve as an entry point to an organization's (e.g., enterprise) or service provider's network core. The edge computing device may include routers, switches, local-area networks (e.g., intranets), wide-area networks (WANs), firewalls, and integrated access devices (IADs). Moreover, the edge computing device may include at least one central processing unit (CPU) or microprocessor, memory (e.g., random access memory (RAM), non-volatile secondary storage) storing executable instructions, and network interfaces.

The at least one processor included in the edge computing device provides intelligence (i.e., smart/intelligent edge computing device) which may include onboard analytics and/or artificial intelligence capabilities. Since the edge computing device has the ability to process certain amounts of data directly on the device itself, rather than uploading, processing and storing data on a cloud (e.g., enterprise management system 130), an organization is able to achieve efficiencies and reduced cost.

High availability of the processing results may be provided to the end users (e.g., client devices 111) since the processing of the data is performed closer to the end users and does not require a connection to the internet (i.e., network system 120) thereby alleviating any downtime associated with a disruption of the internet connectivity (i.e., network system 120). Moreover, in another aspect, high availability of the processed data may be provided to the end users by providing a cluster (i.e., a plurality of devices all connected to enterprise network 114) of enterprise computing devices 112a-112c (e.g., edge computing devices) which are configured to perform redundant data processing with failover operations.

Each enterprise computing device in the cluster may be located at a different geographical location (e.g., different office/site locations of an enterprise (e.g., an organization) and each device may process the same data (e.g., perform the same tax computations) for local redundancy. Each device 112a-112c may receive and store locally all transactions received by the cluster and synchronization with the enterprise management system (cloud host) will occur when normal operations resume.

Each enterprise computing device 112a-112c in the cluster may detect a failover condition from within the cluster. A failover condition may occur, for example, when any one of the devices (e.g., 112a) of enterprise computing devices in the cluster has failed (e.g., the device loses its connection to the enterprise network 114, the device goes off-line for maintenance/updates, a hardware/software failure occurs, a power outage occurs, etc.). When a failover condition occurs to one or more of the devices 112a-112c in the cluster, the remaining devices in the cluster (i.e., the devices that are not experiencing a failover condition) may receive an error signal from the failed enterprise computing device(s)(e.g., 112a) and one of the remaining active devices may resume operations for the failed enterprise computing device(s) (e.g., 112a). Once the failed enterprise computing device resumes active status, the failed enterprise computing device resynchronizes with the remaining enterprise computing devices within the cluster.

Each enterprise computing device 112a-112c in the cluster may receive data (e.g., input data for computations) for processing (e.g., performing tax computations) from any or all of the following: enterprise network 120 (e.g., a private datacenter included therein), client device(s) 111, enterprise management system 140. Each enterprise computing device may process data (e.g., perform tax computations, such as, for example, calculating indirect tax), consistent with the data processing rules (e.g., tax computation rules. The customizable data processing rules are configuration data. The tax computation rules may be customized by a user at the enterprise management system 130 and may be pushed down from enterprise management system 130 to enterprise computing device (e.g., 112a) or to a cluster of enterprise computing devices (112a-112c).

The customized tax computation rules allow a user to change default tax outcomes based on a specific location or situation. So, for example, a custom tax computation rule may stipulate that a retail store in a particular geographical region where an enterprise computing device (e.g., 112*a*) is located (e.g., an Indian Tribal Reservation in Arizona) is to perform indirect tax calculations using a special sales tax instead of a standard local sales tax.

Each enterprise computing device 112*a*-112*c* performs a synchronization process to push the processed data (e.g., calculated tax results) to the enterprise management system 130 consistent with the synchronization rules (i.e., a type of configuration data). The customizable data synchronization rules are configuration data. The synchronization rules may be customized by a user at the enterprise management system 130 (e.g., user may send rules over a network to the enterprise management system) and may be pushed down from enterprise management system 130 to enterprise computing device (e.g., 112*a*) or to a cluster of enterprise computing devices (112*a*-112*c*). The synchronization rules may, for example, establish the schedule/frequency interval (e.g., every 4 hours, every two days, etc.) or time (e.g., every morning at 5:00 am) for which data (e.g., the data processed by the enterprise computing device/cluster of enterprise computing devices) should be synchronized between the enterprise computing device/cluster of enterprise computing devices and the enterprise management system. Moreover, the synchronization rules may establish how the data should be provided to the enterprise management system.

Figure 4:
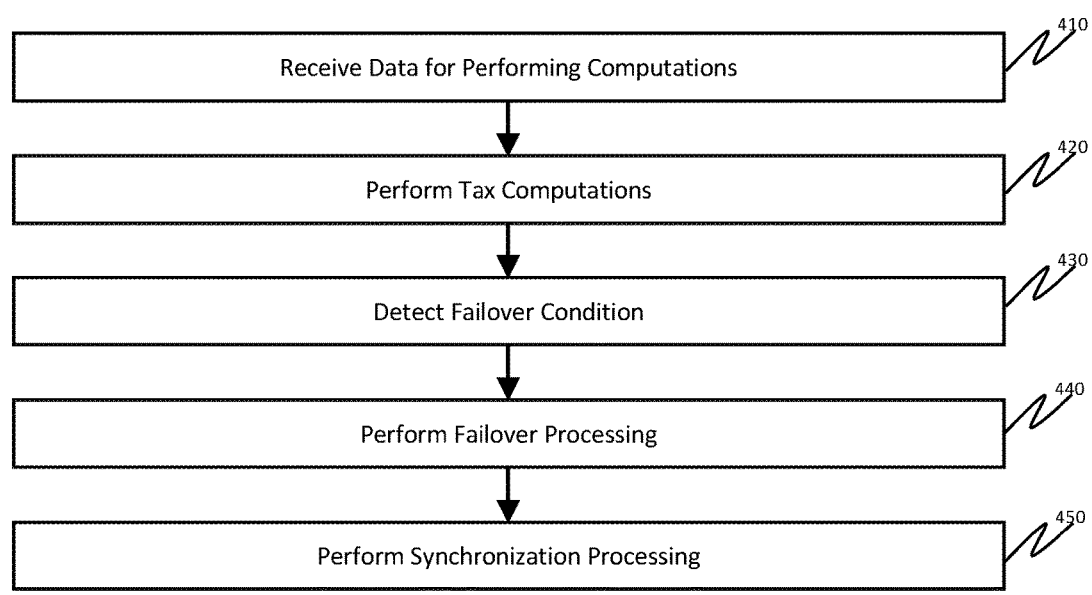
FIG. 4 is a flow diagram illustrating by way of example the steps that may be performed by the system in providing a high availability computing system.

FIG. 4 shows a flow diagram 400 illustrating, by way of example, the steps performed in modules 340, 350, 360 and 370 that may be implemented in accordance with certain embodiments of the present disclosure for providing high availability tax computing. At steps 410-420, enterprise computing device ("ECD") (e.g., 112*a*) may receive data for processing (e.g., performing tax computations) and may process the data (e.g., perform the tax computations) in accordance with user customizable rules (e.g., data processing rules), respectively. In a preferred embodiment, a cluster of enterprise computing devices (112*a*-112*c*) may receive data for processing at step 410, and at step 420 the cluster may perform redundant processing of the data in accordance with user customizable processing rules. At steps 430-440, ECD (e.g., at least one of the enterprise computing devices within the cluster) detects a failover condition within the cluster and performs failover processing within the cluster, respectively. At step 450, ECD performs synchronization processing with enterprise management system 130 in accordance with user customizable synchronization rules. In a preferred embodiment, the cluster (112*a*-112*c*) performs synchronization processing with the enterprise management system in accordance with user customizable synchronization rules at step 450.

According to exemplary embodiments the functional operations described herein can be provided in digital electronic circuitry, or in computer software, firmware, or hardware, including the structures disclosed in this specification and their structural equivalents, or in combinations of one or more of them. Some embodiments of the subject matter of this disclosure, and components thereof, can be realized by software instructions that upon execution cause one or more processing devices to carry out processes and functions described above. Further embodiments of the subject matter described in this specification can be implemented as one or more computer program products, i.e., one or more modules of computer program instructions encoded on a tangible program carrier for execution by, or to control the operation of, data processing apparatus.

One or more exemplary computer programs (also known as a program, software, software application, script, or code) for executing the functions of the exemplary embodiments disclosed herein, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

In some embodiments, the processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be In some embodiments, an apparatus or device embodying the invention may be in the form of a gateway, an access point, a set-top box or other standalone device, or may be incorporated in a television or other content playing apparatus, or other device, and the scope of the present invention is not intended to be limited with respect to such forms.

Components of some embodiments may be implemented as Integrated Circuits (IC), Application-Specific Integrated Circuits (ASIC), or Large Scale Integrated circuits (LSI), system LSI, super LSI, or ultra LSI components. Each of the processing units can be many single-function components, or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

It is also contemplated that implementations and components of embodiments can be done with any newly arising technology that may replace any of the above implementation technologies.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, where operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

Having described the invention in detail, it will be understood that such detail need not be strictly adhered to, but that additional changes and modifications may suggest themselves to one skilled in the art.

What is claimed is:

1. A hybrid system for providing high availability computing, the system comprising:
    an enterprise computing engine for processing at least one on-premise application, the enterprise computing engine comprising:
        at least one cluster of enterprise computing devices, each enterprise computing device including a memory for storing executable instructions, and a processor configured to execute the instructions to:
            detect a failover condition within the cluster; and
            initiate failover processing when a failover condition is detected;
            receive data from an enterprise management system;
            perform computations using the data in accordance with user customizable computation rules; and
            perform synchronization of the computation results with the enterprise management system consistent with user customizable synchronization rules;
    a network system; and
    the enterprise management system comprising:
        at least one processor;
        at least one memory for storing executable instructions, the at least one processor configured to execute the instructions to:
            capture configuration data from one or more resources; and
            push the configuration data to the at least one cluster of enterprise computing devices,
    wherein the user customizable computation rules allow a user to change default tax outcomes based on a specific location or situation, and
    wherein at least one of the user customizable computation rules stipulates that a retail store in a particular geographical region where an enterprise computing device is located is to perform indirect tax calculations using a special sales tax instead of a standard local sales tax.

2. The system of claim 1, further comprising an enterprise network for providing an intranet to the at least one cluster of enterprise computing devices.

3. The system of claim 1, wherein each enterprise computing device in the cluster of enterprise computing devices is an edge computing device.

4. The system of claim 1, further comprising an enterprise gateway including a firewall, the enterprise gateway enabling communication between the at least one cluster of enterprise computing devices and an enterprise management system via the firewall and a network system.

5. The system of claim 1, wherein each enterprise computing device in the cluster may be located at a different geographical location.

6. The system of claim 1, wherein each enterprise computing device in the cluster performs the same computations on the same data for local redundancy.

7. A high availability computing apparatus, the apparatus comprising:
    an enterprise edge computing engine for processing at least one on-premise application, the enterprise edge computing engine comprising:
    at least one cluster of enterprise computing devices, each enterprise computing device including a memory for storing executable instructions, and a processor configured to execute the instructions to:
        detect a failover condition within the cluster;
        initiate failover processing when a failover condition is detected;
        receive data from a datacenter;
        perform computations using the data in accordance with user customizable computation rules; and
        perform synchronization of the computation results with an enterprise management system consistent with user customizable synchronization rules,
    wherein the user customizable computation rules allow a user to change default tax outcomes based on a specific location or situation, and
    wherein at least one of the user customizable computation rules stipulates that a retail store in a particular geographical region where an enterprise computing device is located is to perform indirect tax calculations using a special sales tax instead of a standard local sales tax.

8. The apparatus of claim 7, wherein the datacenter is located in a remote enterprise management system.

9. The apparatus of claim 7, wherein the datacenter is located on an intranet.

10. A method of providing high availability computing using a hybrid system including a cluster of on-premise enterprise computing devices and a cloud-based enterprise management system, the method comprising the steps of:
receiving, by at least one of the on-premise enterprise computing devices in the cluster, configuration data from the cloud-based enterprise management system;
automatically, by the at least one of the on-premise enterprise computing devices in the cluster, processing the configuration data upon receipt;
receiving, by the at least one of the on-premise enterprise computing devices in the cluster, data from at least one client device;
processing, by the at least one of the on-premise enterprise computing devices in the cluster, the received data in accordance with user customizable computation rules; and
automatically transferring, by the at least one of the on-premise enterprise computing devices in the cluster, the processed data to the cloud-based enterprise managements in accordance with the configuration data,
wherein the user customizable computation rules allow a user to change default tax outcomes based on a specific location or situation, and
wherein at least one of the user customizable computation rules stipulates that a retail store in a particular geographical region where an enterprise computing device is located is to perform indirect tax calculations using, a special sales tax instead of a standard local sales tax.

11. The method of claim 10, wherein the configuration data is received by the at least one of the on-premise enterprise computing devices in the cluster upon approval by a firewall.

12. The method of claim 10, wherein the configuration data includes user customizable rules for synchronizing data.

13. The method of claim 10, wherein the configuration data is a system update for the at least one of the on-premise enterprise computing devices in the cluster.

14. A method of providing high availability computing, the method comprising the steps of:
receiving, by the at least one cluster of enterprise computing devices, data from at least one client device;
performing redundant processing, by the at least one cluster of enterprise computing devices, of the data in accordance with user customizable computation rules;
detecting, by at least one of the enterprise computing devices in the cluster, a failover condition from another enterprise computing device within the cluster;
initiating, by the at least one enterprise computing device in the cluster, failover processing within the cluster when the failover condition is detected;
performing, by the at least one cluster of enterprise computing devices, synchronization of the results of the data processing with an enterprise management system consistent with user customizable synchronization rules,
wherein the user customizable computation rules allow a user to change default tax outcomes based on a specific location or situation, and
wherein at least one of the user customizable computation rules stipulates that a retail store in a particular geographical region where an enterprise computing device is located is to perform indirect tax calculations using a special sales tax instead of a standard local sales tax.

15. The method of claim 14, further comprising,
receiving, by at least one cluster of enterprise computing devices, configuration data from an enterprise management system; and
automatically, by the at least one cluster of enterprise computing devices, processing the configuration data upon receipt.

16. The method of claim 14, further comprising,
performing a resynchronization, by the at least one cluster of enterprise computing devices, within the cluster when the detected failed enterprise computing device resumes activity within the cluster.

17. The method of claim 14, wherein each enterprise computing device within the cluster is an edge computing device.

* * * * *